United States Patent [19]

Pebre

[11] Patent Number: 5,407,289
[45] Date of Patent: Apr. 18, 1995

[54] CONNECTING DEVICE BETWEEN A GLASS AND A GLASS-WINDER DRIVING MECHANISM

[75] Inventor: Thierry Pebre, Checy, France

[73] Assignee: Rockwell Automotive Body Systems, France

[21] Appl. No.: 51,726

[22] Filed: Apr. 22, 1993

[30] Foreign Application Priority Data

Apr. 27, 1992 [FR] France .................. 92 05175

[51] Int. Cl.⁶ .................................. F16B 9/00
[52] U.S. Cl. .......................... 403/252; 403/224; 403/254; 403/372
[58] Field of Search ............... 403/252, 253, 254, 154, 403/155, 224, 291, 263, 372

[56] References Cited

U.S. PATENT DOCUMENTS

| | | | |
|---|---|---|---|
| 2,719,750 | 10/1955 | Orr | 403/252 |
| 2,850,333 | 9/1958 | Hammann. | |
| 4,443,144 | 4/1984 | Defrancq | 403/155 |
| 4,505,058 | 3/1985 | Peterson | 403/155 |
| 4,733,987 | 3/1988 | Tomlinson et al. | 403/155 |
| 4,865,503 | 9/1989 | Kaimo | 403/155 |

FOREIGN PATENT DOCUMENTS 904509 2/1954 Germany.
3634787 10/1987 Germany.
3817260 11/1989 Germany.

*Primary Examiner*—John T. Kwon

[57] ABSTRACT

The device comprises a bearing (3) carrying the glass (1), a stud (6) extending throughout the bearing and fixed to a carriage (2) of the driving mechanism, and means for locking the bearing to the stud comprising an elastically yieldable member (7) adapted to be clipped to the bearing before inserting the stud in the latter and adapted to grip the stud so as to fix it to the bearing. The member (7) is a clip having two arms (8) which are capable of being elastically spread apart on each side of a central bore (5) provided in the bearing (3) for the passage of the stud (6), slots (11) being formed in the bearing each of which receives a respective arm of the member (7). This arrangement permits pre-assembling the locking member with the bearing before the insertion of the stud (6) and consequently avoiding the necessity of assembling the clip "blind" in the door with risk of a defective assembly or loss of the locking member.

11 Claims, 3 Drawing Sheets

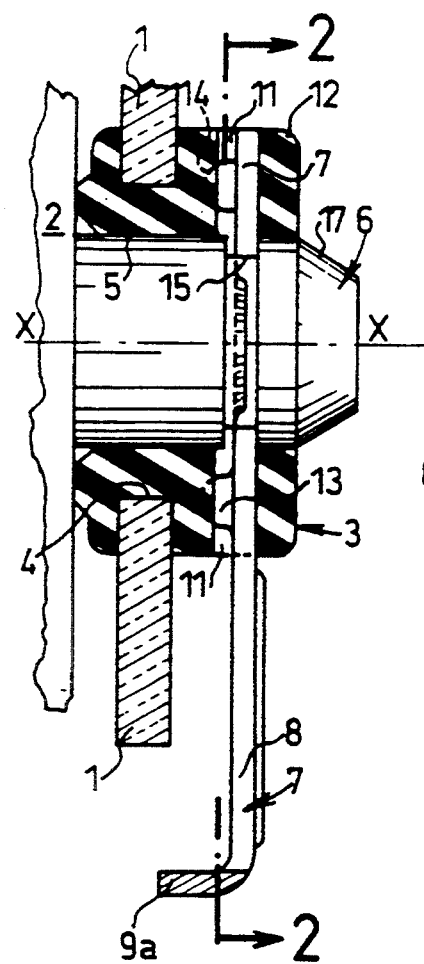
FIG·1
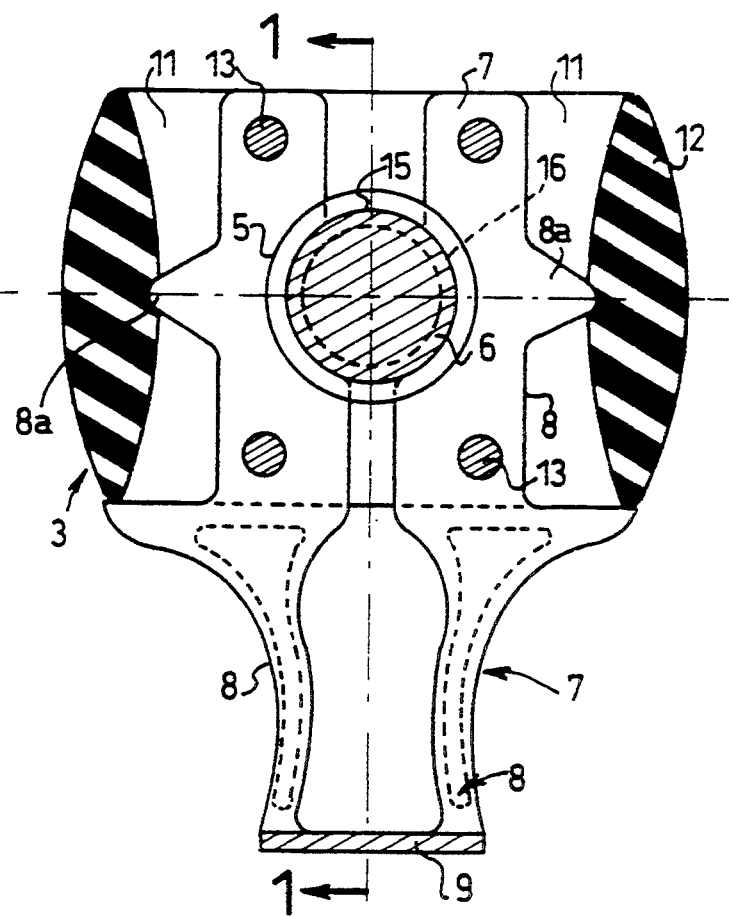
FIG·2
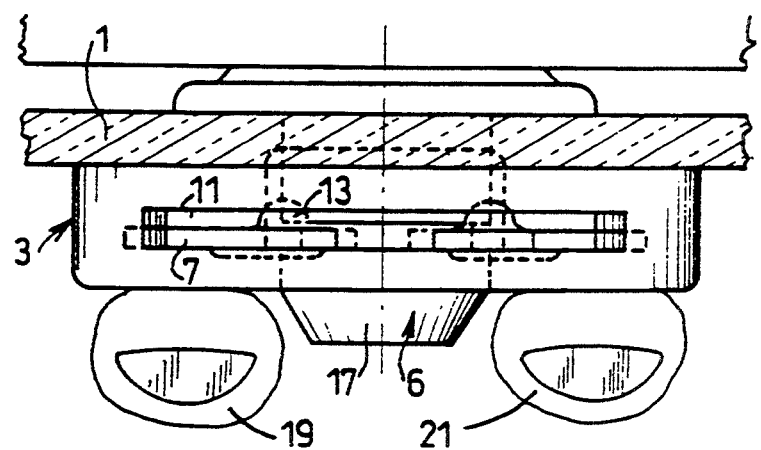
FIG·3

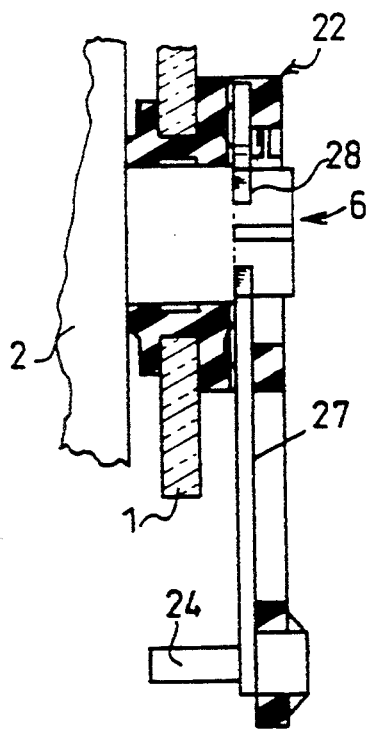
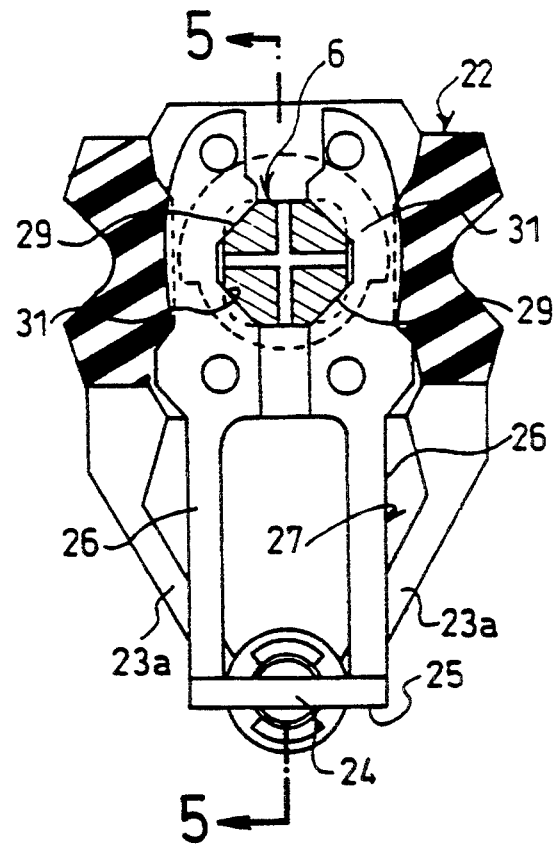
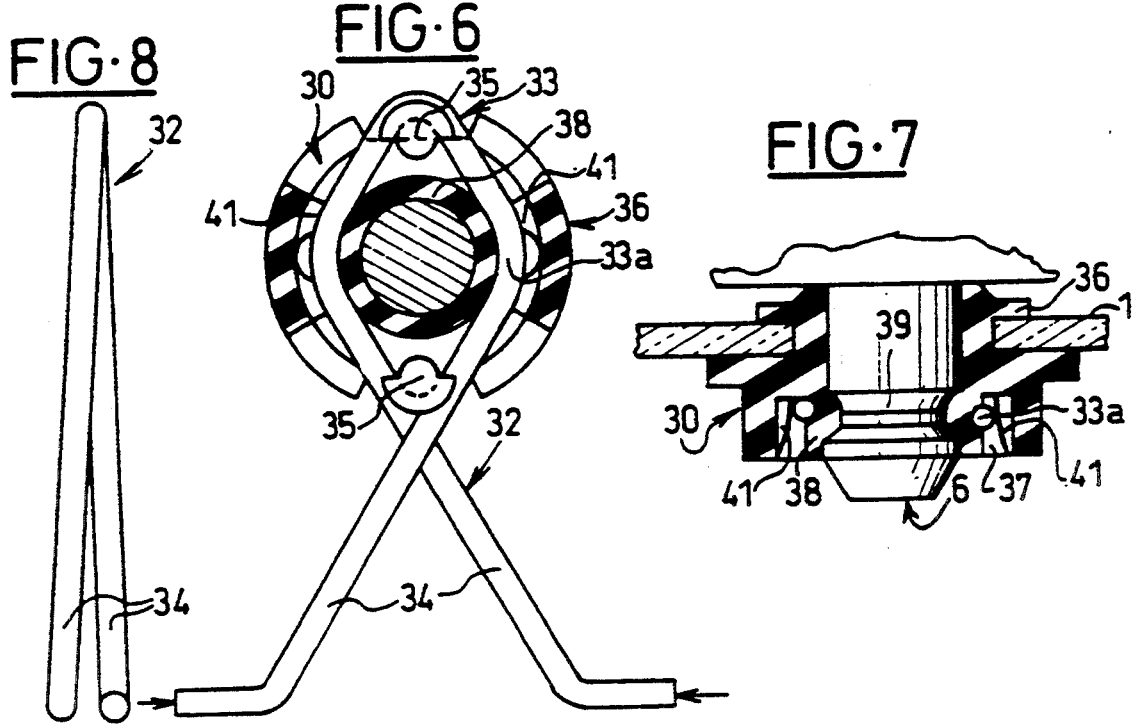

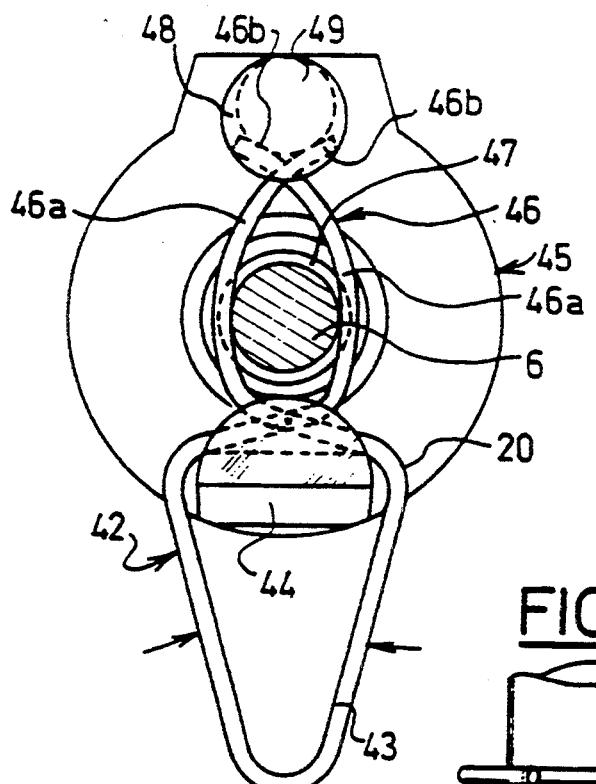
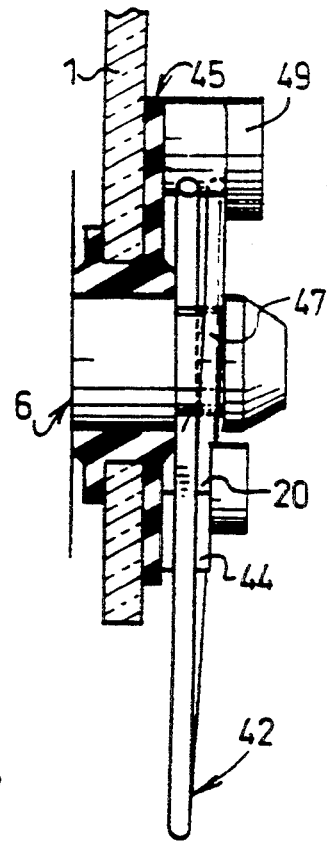
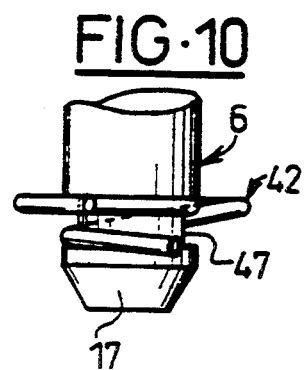
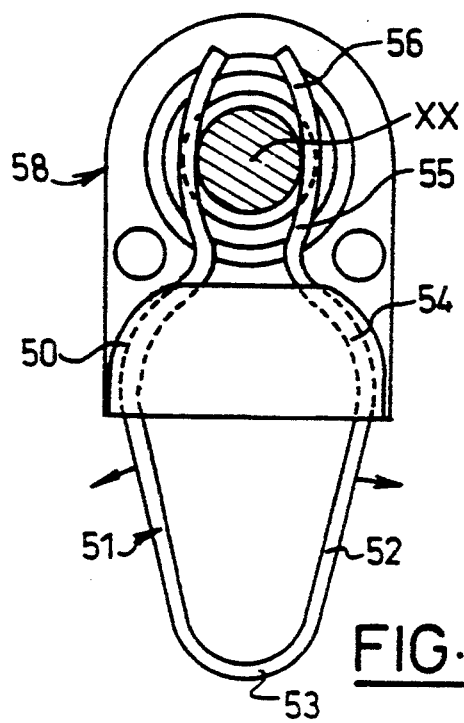
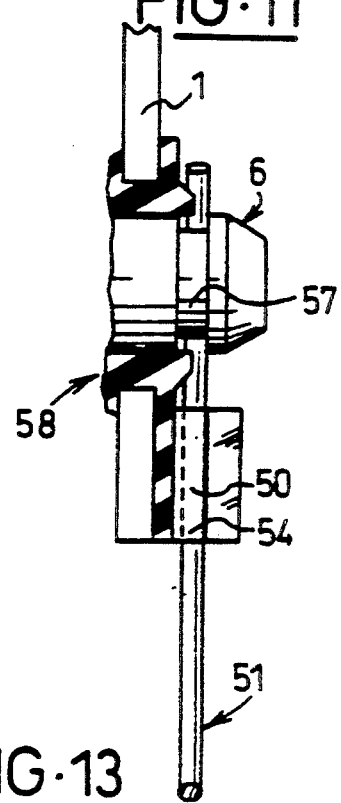
FIG·9 FIG·10 FIG·11 FIG·12 FIG·13

5,407,289

CONNECTING DEVICE BETWEEN A GLASS AND A GLASS-WINDER DRIVING MECHANISM

BACKGROUND OF THE INVENTION

1. Field of the Invention

The present invention relates to a connecting device between a window glass and a driving mechanism of a glass-winder employing a cable, in particular of the cable and drum type, in a vehicle door.

2. Description of the Related Art

A known connecting device comprises a glass carrying bearing inserted in an aperture of the glass, a stud extending throughout this bearing and being fixed to a carriage of the driving mechanism, and means for locking the bearing on the stud. These means are formed by a plate provided with an orifice through which the nose of the stud is capable of extending, the contour of this orifice being clipped into a groove of the stud so as to fix the bearing to the latter. With the bearing placed in position in the corresponding aperture of the glass, the stud of the carriage is passed through the bearing, then the locking member is mounted on the nose of the stud which projects from the bearing. The locking member is placed in position manually inside the door practically in a "blind" manner and therefore by groping, which is consequently rather difficult. It could happen that the operator drop the member inside the door from which it can no longer be recovered before delivery of the vehicle, or that this locking member subsequently become detached owing to a defective assembly.

An object of the invention is therefore to provide a device of the aforementioned type which is so arranged that the locking member can be pre-assembled with the bearing before placing the latter and the glass in the door and before the stud is placed in position in the bearing.

SUMMARY OF THE INVENTION

According to the invention, the locking means comprise an elastically yieldable member clipped on the bearing before the insertion of the stud in the bearing and adapted to grip the stud so as to secure it to the bearing.

In one embodiment of the invention, the locking member is a clip comprising two arms which may be elastically spread apart on each side of the bearing in which are provided, on each side of a central bore for the passage of the stud, slots each adapted to receive a respective arm of the clip.

It will therefore be understood that this arrangement permits pre-assembling the elastically yieldable clip with the bearing before the stud of the carriage of the glass winder is inserted in the bearing, owing to a mutual adaptation of the bearing and the locking clip. In this way, it is possible to avoid the manual "blind" assembly inside the door and therefore the aforementioned drawbacks.

Further features and advantages of the invention will be apparent from the following description with reference to the accompanying drawings which illustrate several embodiments of the invention by way of non-limitative examples.

BRIEF DESCRIPTION OF THE DRAWINGS

FIG. 1 is a vertical half-sectional, half-elevational view, to scale, of a first embodiment of the connecting device between a window glass and a driving mechanism of a glass winder employing a cable in a vehicle door, taken on line 1—1 of FIG. 2;

FIG. 2 is a vertical sectional view and a partial elevational view taken on line 2—2 of FIG. 1;

FIG. 3 is a top plan view of the device of FIGS. 1 and 2;

FIG. 4 is an elevational view, of the side pertaining to the locking clip, of a second embodiment of the connecting device according to the invention;

FIG. 5 is a vertical half-sectional and half-elevational view taken on line 5—5 of FIG. 4;

FIG. 6 is an elevational view, of the side pertaining to the locking clip, of a third embodiment of the device according to the invention;

FIG. 7 is a top plan view, partly in section, of the device of FIG. 6;

FIG. 8 is a side elevational view of the locking clip of FIGS. 6 and 7;

FIG. 9 is a front elevational view of a fourth embodiment of the device according to the invention;

FIG. 10 is a top plan view of the stud and the locking clip of the device of FIG. 9;

FIG. 11 is a side elevational view, partly in section, of the device of FIG. 9;

FIG. 12 is a front elevational view, of the side pertaining to the locking clip, of a fifth embodiment of the device according to the invention, and FIG. 13 is a side elevational view, partly in section, of the device of FIG. 12.

DESCRIPTION OF THE PREFERRED EMBODIMENTS

The device shown in FIGS. 1 to 3 is adapted to ensure a connection between a window glass 1 of a side door (not shown) of an automobile vehicle, and a carriage 2 of a driving mechanism (not shown) known per se, of a glass winder employing a cable and a drum or any other system guiding a glass by means of a rail and a carriage.

This device comprises a bearing 3, made from an elastically compressible material such as rubber, which is so dimensioned as to be insertable in an aperture 4 the glass 1 and including a groove receiving the edge of the glass 1 which delimits the aperture 4. Provided the bearing 3 is an axial throughway bore 5 which is adapted to receive a stud 6 fixed to the carriage 2 of the glass winder so as to couple the glass 1 with the carriage 2.

The connecting device comprises means for locking the bearing 3 to the stud 6. In the embodiment shown in FIGS. 1 to 3, these locking means comprise a clip 7 provided with two arms or tabs 8 which are interconnected at their ends by a transverse connecting portion 9 and are capable of elastically spreading apart on each side of the central bore 5 to allow the passage of the stud 6. Formed in the bearing 3, on each side of the bore 5 and therefore the stud 6, are slots 11 which extend in a direction perpendicular to the axis X—X of the stud 6 and are bounded, on the side remote from the bore 5, by end walls 12 constituting abutments which transversely retain the arms 8. In the presently-described embodiment, each of the latter is provided with a projection 8a which comes to bear against the corresponding end wall 12 constituting an abutment, so that the arms 8 are maintained in the position shown in FIG. 2 under a slight stress. Each of the arms 8 has, on the side thereof facing toward the glass 1, bosses 13 which are for example two in number on each arm 8 and are capable of bearing in corresponding cavities 14 in the slots 11.

Provided in the stud 6, in alignment with the slots 11, is a groove 15 into which the confronting edges of the arms 8 are capable of becoming elastically clipped, these edges being provided with part-circular notches 16 which have the same radius as the groove 15. Provided on the nose of the stud 6 is an annular bevel 17 of suitable inclination with respect to the axis X—X, for example 30°, and the connecting portion 9 of the clip 7 is extended in the direction toward the carriage 2 by a flange 9a.

The device just described is assembled in the following manner.

First of all the bearing 3 is inserted in the bore 5 provided at the base of the glass 1. Secondly, the elastically yieldable clip 7 is pre-assembled with the bearing 3 by spreading the two arms 8 apart for the purpose of inserting them in the respective lateral slots or recesses 11. This clipping of the arms 8 in the slots 11 and the groove 15 is accomplished merely by exerting a pressure by means of two fingers 19, 21 of the hand (FIG. 3). The arms 8 take up the position shown in FIG. 2 in the slots 11 with their projections 8a bearing against the end walls 12. The bosses 13 are inserted under a slight stress in the flexible bearing 3 and facilitate the clipping action.

This pre-assembly of the clip 7 with the bearing 3 is effected outside the door and therefore with no difficulty. Thereafter, the glass, its bearing and the clip 7 are introduced in the door.

Lastly, the carriage 2 is brought to the vicinity of the bearing so as to insert the stud 6 in the bore 5. The bevel 17 facilitates the introduction of the stud 6 between the arms 8 which slide along the bevel and become spread apart on each side. When the stud 6 has passed completely through the bearing 3, the arms 8 are in alignment with the groove 15 into which they become elastically clipped while being maintained under a slight stress by the side walls 12. The coupling between the glass 1 and the carriage 2 is now terminated.

The clip 7 may be easily disconnected from the stud by manually extracting it, this being facilitated by the lower flange 9a.

In the embodiment shown in FIGS. 4 and 5, the bearing 22 is extended by a yoke 23 formed by two branches 23a arranged in a V-shape in the vertex portion of which is provided an orifice for the passage of a pin 24 carried by the transverse connecting portion 25 interconnecting the two arms 26 of the elastically yieldable clip 27.

This arrangement enables the clip 27 to be retained in the bearing 22 after the uncoupling of the latter from the stud 6. A groove 28 is provided in the nose of the stud 6, this groove not being circular as in the preceding embodiment but constituted by a succession of four flat faces 29 defining a square the corners of which are truncated. Correspondingly, the confronting edges of the arms 26 define, in the region of the groove 28, flat faces 31 adapted to bear against the flat faces 29 when the stud 6 is suitably oriented about its axis.

In the third embodiment shown in the FIGS. 6 to 8, the elastically yieldable clip is constituted by a metal wire 32 bent in such manner as to form a loop 33 substantially in the shape of a diamond extended by two free divergent wire portions 34 for manually acting on the clip. The loop 33 is adapted to become engaged in slots 37 opening onto the face of the bearing 36 adjacent the beveled nose of the stud 6. More precisely, the sides 33a of the loop 33 surround a collar portion 38 of the bearing 36 which fills a groove 39 formed in the stud 6, the inside profile of the collar portion 38 corresponding to that of the groove 39 (FIG. 7).

The sides 33a of the loop 33 elastically clamp the collar portion 38 against the stud 6. At the upper and lower ends, the loop 33 bears against projections 35 on the bearing 36. The sides 33a are gripped between the collar portion 38 and deformable ribs 41 of the bearing 36 at the bottom of the slots 37.

In this embodiment, the bearing 36 is first of all assembled with the stud 6 by means of the collar portion 38 which is suitably shaped to fill the groove 39, and this assembly is rendered more firm by the gripping action of the elastically yieldable sides 33a of the loop 33.

In order to place the wire member 32 in position, the arms 34 are shifted toward each other by pressing against their ends (see arrows in FIG. 6) so as to enlargen the loop 33. The latter is placed in the slots 37 by pushing on the sides 33a until they reach the position shown in FIG. 7, then the arms 34 are released and the pre-stressing results in an elastically yieldable gripping of the collar portion 38 between the sides 33a.

In the fourth embodiment of the invention shown in FIGS. 9 to 11, the clip 42 is formed by a metal wire which is bent in such manner as to define a first loop 43—capable of bearing, on a corresponding hooking projection 44 on the bearing 45, in slots 20 formed in the bearing 45 and defining the projection 44—and a second loop 46 which is smaller than the loop 43. The sides 46a of the loop 46 elastically grip the bottom of the groove 47 of the stud 6 and are extended by free end wire portions 46b which cross each other and bear against a recess 48 formed in the upper part of the bearing 45. This recess 48 is defined on one side by a boss 49, the free end portions 46b being interposed between this boss and the confronting side of the recess 48. Bearing in mind that the two elastically yieldable sides 46a are disposed in the groove 47 with a slight axial offset shown in FIG. 11, the width of the groove 47 must be greater than the width of the grooves 15, 28, 39 of the other described embodiments.

The wire member 42 may be placed in position on the bearing 45, or removed from the latter, by exerting a pressure on the two wire portions of its large loop 43 in the direction of the arrows shown in FIG. 9, which has for effect to spread apart the wire portions 46a and their end portions 46b. The locking wire member arranged in this manner is "unlosable" once it has been placed in the slots 20 in its clipping position shown in FIGS. 9 to 11 owing to the pre-stressing of its wire portions.

In the embodiment shown in FIGS. 12 and 13, the clip 51 is also formed by a metal wire which is bent in such manner that it forms two incomplete or open loops owing to the elimination of the crossing points in the region of the ends of the two loops 43 and 46 of the embodiment shown in Figs. 9 to 11. Thus, in this embodiment, the locking clip 51 comprises a first large loop 52 constituted, on each side of a curved connecting portion 53, by a rectilinear wire portion followed by a curved wire portion 54. The two portions 54 converge toward each other and then form an elbow portion 55 followed by an end wire portion 56 which is bent in such manner as to be capable of entering a groove 57 in the stud 6. The curved portions 54 are received in lateral slots 50 which are formed in the bearing 58 and open onto a face of the latter to permit the insertion of the portions 54. The latter therefore exert an elastically yieldable gripping action on the inner sides of the slots 50, by means of which the clip 51 may be pre-assembled with the bearing 58 before the stud 6 is inserted between the gripping portions 56 to be received in the groove 57 to thereby lock the bearing 58 to the stud 6.

The clip 51 may be assembled and disassembled by spreading apart the portions of the large loop 52 in the directions shown by the arrows in FIG. 12.

It must be understood that the scope of the invention is not intended to be limited to the described embodiments and may include many embodiments, it being possible to considerably vary the shapes and the geometries of the locking clips and the arrangements of the corresponding bearings.

What is claimed is:

1. Connecting device between a glass and a glass driving mechanism in a vehicle door, said device comprising in combination: a bearing for carrying said glass, a stud extending through said bearing and fixed to said driving mechanism, and means for locking said bearing to said stud, said locking means comprising an elastically yieldable member clipped on said bearing before insertion of said stud in said bearing and affixing said stud to said bearing.

2. Device according to claim 1, comprising a central bore in said bearing for the passage of said stud, said locking member being a clip comprising two arms which are capable of being elastically spread apart on each side of said central bore, slots being formed in said bearing, each of which slots receiving a respective one of said arms of said clip.

3. Device according to claim 2, comprising a groove formed in said stud in which said arms of said clip are capable of being clipped.

4. Device according to claim 2, comprising lateral abutments provided on said bearing which limit the extent of spreading of said arms.

5. Device according to claim 2, wherein said bearing is made from an elastically yieldable material, a yoke extending said bearing and capable of being connected to an end of said locking clip so as to retain said clip when it is uncoupled from said bearing and said stud.

6. Device according to claim 2, wherein said bearing includes a collar portion, said stud includes a groove, and said clip is constituted by a metal wire which is bent in such manner as to form a loop and two free divergent handling portions extending said loop, said loop being insertable in said slots in said bearing by surrounding said collar portion, said collar portion filling said groove of said stud, whereby said loop elastically clamps said collar portion on said stud and thus renders the connection of said stud to said bearing more firm.

7. Device according to claim 2, wherein said clip is constituted by a metal wire bent in such manner as to define a first loop which is capable of bearing in said slots against a corresponding hooking projection of said bearing, and a second loop which is capable of elastically gripping said stud, said second loop being extended by free end wire portions which bear in a recess in said bearing.

8. Device according to claim 7, wherein said arms of said metal wire form two loops which cross in the region of end portions thereof.

9. Device according to claim 7, wherein said arms of said metal wire form two incomplete open loops.

10. Device according to claim 2, wherein said stud has a nose on which an annular bevel is provided.

11. Device according to claim 2, wherein said groove has a bottom profile defining flat faces, a corresponding profile of confronting edges of said elastically yieldable arms of said clip being capable of clipping against said flat faces of said groove.

* * * * *